Sept. 27, 1932.   J. C. McCUNE   1,879,703
FLUID PRESSURE BRAKE
Filed Nov. 21, 1930

INVENTOR.
JOSEPH C. McCUNE
BY
*Wm. H. Cady*
ATTORNEY.

Patented Sept. 27, 1932

1,879,703

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed November 21, 1930. Serial No. 497,238.

This invention relates to fluid pressure brakes and more particularly to improvements in automatic brake apparatus of the type in which the brakes are applied upon a reduction in brake pipe pressure and released upon an increase in brake pipe pressure.

An object of the invention is to provide an improved automatic brake equipment for motor cars of the type having controls at each end.

Another object of the invention is to provide an improved automatic brake equipment in which means are provided for effecting an extremely quick service application and release of the brakes.

Another object of the invention is to provide an improved automatic brake equipment in which means are provided for preventing the operation of the emergency portion of the brake equipment when a service reduction in brake pipe pressure is effected.

Another object of the invention is to provide an improved automatic brake equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing.

With the standard fluid pressure brake apparatus now in use, the time required in effecting a service application of the brakes has been comparatively long, due to the slow response of the several operative parts of the apparatus to variations in brake pipe pressure, as initiated by the operator. The same is also true of the release of the brakes after service.

Present day practice demands a more speedy acting equipment, so that a quick service application and a quick release of the brakes can be effected, and the present invention aims to provide an improved fluid pressure brake equipment of this character.

Figures 1, 2, 3:
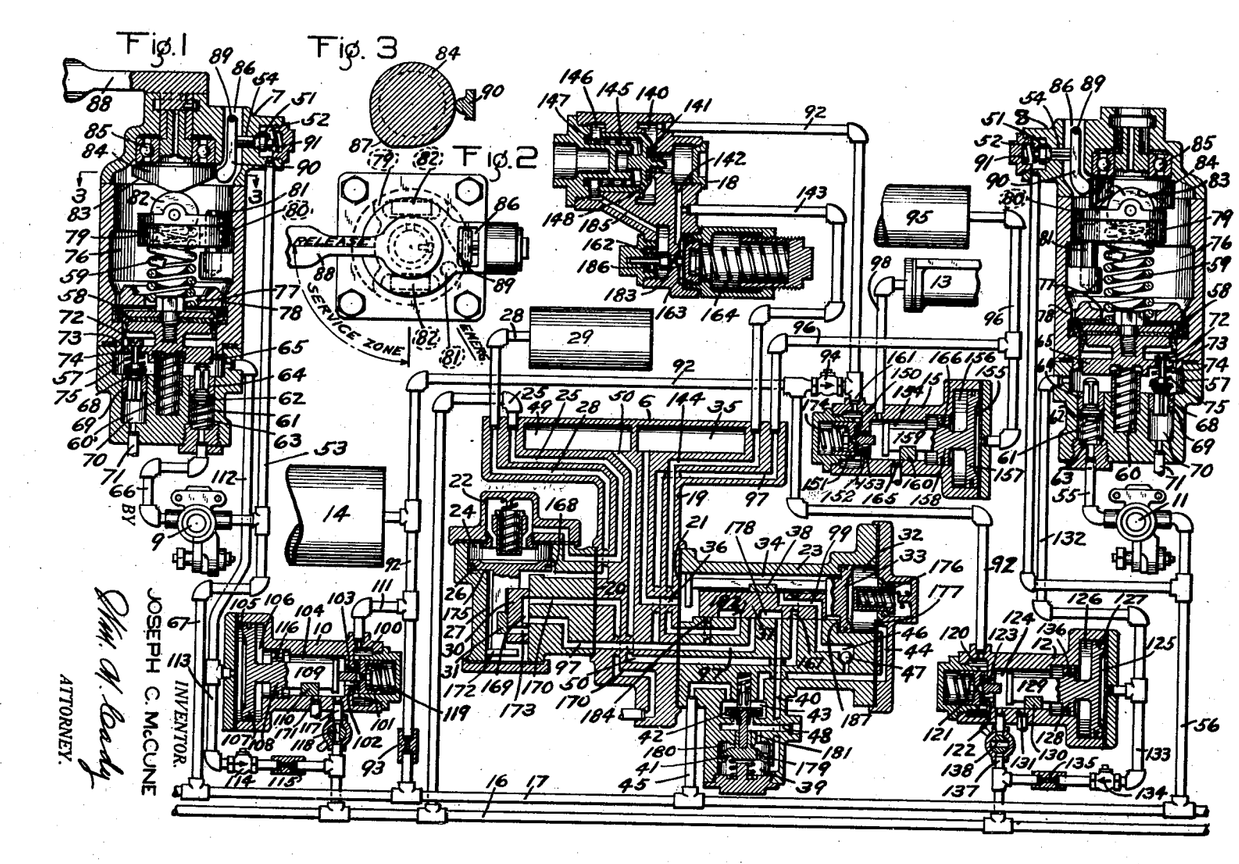
Figure 1 is a diagrammatic view, mostly in section, of a fluid pressure brake apparatus embodying the invention.
Fig. 2 is a plan of one of the brake valve devices, showing the handle in release position.
Fig. 3 is a horizontal section taken on the line 3—3 of Fig. 1 showing the emergency cam of the brake valve device.

Referring to the drawing, the equipment is of the usual double end type and comprises, at one end of the car, a brake valve device 7, feed valve device 9 and relay valve device 10, and at the other end of the car a brake valve device 8, feed valve device 11, and relay valve device 12. The equipment also comprises a main brake control valve device 6, brake cylinder 13, main reservoir 14, a relay valve 15 associated with the brake cylinder 13, a brake pipe 16, an emergency pipe 17, and a limiting valve device 18.

Since the feed valve devices 9 and 11 are of the well known type which are usually employed with fluid pressure brake apparatus for regulating or controlling the flow of fluid under pressure from a source of high pressure to a pipe, chamber, or other space in which the fluid is to be maintained at a certain lower degree of pressure, they have not been shown in detail.

The main brake control valve device 6 may comprise a pipe bracket 19, which is shown as being provided with opposed faces 20 and 21. Attached to the face 20 of the pipe bracket 19, is a service valve mechanism 22, and attached to the face 21 of the pipe bracket, is an emergency valve mechanism 23.

The service valve mechanism 22 may comprise a casing having a piston chamber 24 connected to the brake pipe 16 by a passage and pipe 25 and containing a piston 26 and having a valve chamber 27, connected by a passage and pipe 28 to an auxiliary reservoir 29 and containing a main slide valve 30 and an auxiliary slide valve 31 adapted to be operated by piston 26.

The emergency valve mechanism 23 is shown as comprising a casing having a piston chamber 32 containing a piston 33 and having a valve chamber 34 connected to a quick action chamber 35 by a passage 36 and containing a main slide valve 37 and an auxiliary slide valve 38 adapted to be operated by piston 33.

Associated with the emergency valve mechanism 23, is a quick action valve device comprising a piston chamber 39 connected to a passage 40 leading to the seat of the main slide valve 37 and containing a piston 41 adapted to operate a vent valve 42 contained in a chamber 43.

The chamber 43 is connected to the piston chamber 32 by a passage 44, and also connected to the emergency pipe 17 by a passage and pipe 45. Passage 44 in turn is also connected to the seat of the main slide valve 37, by a passage 46 containing a ball check valve 47 for preventing the back flow of fluid under pressure.

The vent valve 42 is adapted to control the venting of fluid from chamber 43 to the atmosphere, through a passage or vent port 48.

A quick action closing chamber 49 is connected to the seat of the main slide valve 37 by a passage 50.

Since the piston chamber 24 of the service valve mechanism 22 is connected to the brake pipe 16, while the piston chamber 32 of the emergency valve mechanism 23 is connected to the emergency pipe 17, and since he fluid under pressure supplied by the emergency pipe 17 for operating the piston 33 of the valve mechanism, is adapted to be controlled, in a manner to be hereinafter more fully described, by separate means than the means provided for controlling the fluid under pressure in the brake pipe 16, it will be understood that when the service valve mechanism 22 is operated to effect a service application of the brakes, the emergency valve mechanism 23 will remain inactive, irrespective of the amount of reduction in brake pipe pressure.

The brake valve devices 7 and 8 are similarly formed, and each may comprise a casing having a piston chamber 57 containing a piston 58 subject on one side to the pressure of a heavy coil spring 59 and subject on the opposite side to the pressure of a light coil spring 60 and also to the pressure of fluid supplied to chamber 57 during the operation of the device, as will be hereinafter more fully described.

Contained in a chamber 61 formed in the casing beneath the piston chamber 57, is a fluid pressure supply valve 62 which is normally held seated by a coil spring 63 mounted in chamber 61. The supply valve 62 has a fluted stem extending through an opening 64 formed in the casing between the valve chamber 61 and the piston chamber 57, the extremity of said valve stem terminating a suitable distance below an abutment 65 carried by the piston 58 when the piston is in its up position. The valve chamber 61 of the brake valve device 7 is connected to the feed valve device 9 by a pipe 66 and the feed valve device 9 is in turn connected to the emergency pipe 17 by a pipe 67. The valve chamber 61 of the brake valve device 8 is connected to the feed valve device 11 by a pipe 55 and the feed valve device 11 is in turn connected to the emergency pipe 17 by a pipe 56.

Contained in the piston chamber 57 is a release valve 68 having a fluted stem extending through an opening 69 formed in the casing between said piston chamber and a chamber 70 which is connected to the atmosphere by a pipe 71.

The release valve 68 is provided with an upwardly extending headed stem 72 which passes through a slot 73 formed in a laterally projecting flange 74, with which the piston 58 is provided. For the purpose of pressing the release valve 68 away from the piston 58, a coil spring 75 is interposed between the head of said valve and the flange 74.

The construction is such that the release valve 68 is so connected to the piston 58 that in handle off position, said valve is held off its seat, as shown at the right in Fig. 1, and in normal release position, the release valve is seated by the pressure of spring 75 which is compressed by the downward movement of the piston 58, as shown at the left in Fig. 1.

It will be noted that the release valve 68 is so connected to the piston 58, that a limited amount of movement of the piston relative to the release valve is provided for. This is desirable, since it permits the piston to move a slight distance away from the release valve, when said valve is seated, without unseating the valve.

The spring 59 is mostly disposed in a chamber 76 formed in the casing above the piston chamber 57 and connected thereto through a central opening 77, which is made large enough to permit the spring 59 to pass therethrough, and a pluarlity of smaller openings 78 arranged around the wall of the casing.

Also contained in the chamber 76 and enclosing the top of the spring 59, is a cap 79 which is mounted for rectilinear movement in the chamber. In order to guide the cap 79 and prevent rotative movement thereof, the cap is provided with an opening 80 through which extends a pin 81 fixed within the casing.

Journalled on the top of the cap 79 are rollers 82, which engage with cam faces 83 formed on the lower side of a cam 84 supported in the upper portion of the casing by an annular ball bearing 85.

The cam 84 is provided with an upwardly projecting stem adapted to receive an operating handle 88 which is detachably connected thereto in any approved manner. As shown, only one brake valve handle 88 is provided per car and is used on the brake valve device at the front or operative end of the car.

Each brake valve device is also provided with an emergency valve 51 which is contained in a chamber 52 connected to the pipe 67 by a pipe 53. The chamber 52 is disposed near the top of the brake valve casing and the valve 51 has a fluted stem which projects through an opening 54 in the wall of the casing between chamber 52 and an opening 86. The opening 86 is formed as an upwardly extending portion of the chamber 76, and is located at one side of the cam 84.

Pivotally mounted on a pin 89 which spans the opening 86, is an arm 90. The arm extends downwardly into the chamber 76 and one side of the arm is engaged by the end of the stem of the emergency valve 51, while on the opposite side, the lower end of the arm 90 engages the side wall of the cam 84, said side wall being provided with a cam surface 87, as shown in Fig. 3. The emergency valve 51 is normally held seated by a spring 91 mounted in chamber 52.

The relay valve devices 10, 12 and 15, may each be of like construction.

The relay valve device 10 may comprise a casing having a valve chamber 100 containing a spring-pressed valve 101. The valve 101 is adapted to normally seat against a seat rib 102, so as to control communication through an opening 103, connecting chamber 100 with a chamber 104.

For the purpose of actuating the valve 101, the casing is provided with piston chambers 105 and 106, containing connected pistons 107 and 108 respectively. Projecting rearwardly from the piston 108 and disposed in the chamber 104, is a stem 109, which is provided with a slide valve 110. The stem 109 terminates adjacent to the stem of the valve 101.

Valve chamber 100 is connected to the main reservoir pipe 92 by a pipe 111.

Piston chamber 105 is connected to the piston chamber 57 of the brake valve device 7, by a pipe 112 and also to the brake pipe 16, by a pipe 113. Pipe 113 is provided with a check valve 114 and a choke 115.

Piston chamber 106 is connected to the slide valve chamber 104, by a port 116 through piston 108.

The slide valve chamber 104 is connected to the pipe 113, beyond the check valve 114 and the choke 115, by a pipe 117 which is provided with a manually operated angle cock 118.

The pipe 92 is connected at one end to the emergency pipe 17 and is also connected at the other end to the relay valves 12 and 15, in the manner to be hereinafter described. Between its connection with the pipes 17 and 111, the main reservoir pipe 92 is provided with a choke 93. The purpose of the choke 93 is to guard against quick loss of main reservoir pressure in case of a burst hose and to enable the emergency valve 57 to cause sufficient reduction of the emergency pipe pressure when an emergency application is desired so that the emergency valve mechanism will act quickly.

The relay valve device 12 comprises a casing having a valve chamber 120 containing a spring-pressed valve 121. The valve 121 is adapted to normally seat against a seat rib 122, so as to control communication through an opening 123, connecting chamber 120 with a chamber 124.

For the purpose of actuating the valve 121, the casing is provided with piston chambers 125 and 126, containing connected pistons 127 and 128 respectively. Projecting rearwardly from the piston 128 and disposed in the chamber 124, is a stem 129, which is provided with a slide valve 130. The stem 129 terminates adjacent to the stem of the valve 121. The main reservoir pipe 92 is connected to the valve chamber 120.

Piston chamber 125 is connected to the piston chamber 57 of the brake valve device 8, by a pipe 132 and also to the brake pipe 16, by a pipe 133. Pipe 133 is provided with a check valve 134 and a choke 135.

Piston chamber 126 is connected to the slide valve chamber 124, by a port 136 through piston 128.

The slide valve chamber 124 is connected to the pipe 133, beyond the check valve 134 and the choke 135, by a pipe 137 which is provided with a manually operated angle cock 138.

The check valves 114 and 134 prevent back flow of brake pipe pressure to the brake valve devices 7 and 8 respectively, when a service application is made. This permits an almost immediate reduction of pressure on the face of the pistons 107 and 127 of the relay valve devices 10 and 12 respectively when a service application is initiated.

The purpose of the chokes 115 and 135 is to permit the food valves 9 and 11 respectively to care for small fluctuations of brake pipe pressure without causing the operation of the relay valve devices 10 and 12 respectively and prevent faulty operation of the feed valves, due to the small pipe volume between the feed valves and the relay valves by providing a bleed to the brake pipe 16.

The relay valve device 15 comprises a casing having a valve chamber 150 containing a spring-pressed valve 151. The valve 151 is adapted to normally seat against a seat rib 152, so as to control communication through an opening 153, connecting chamber 150 and a chamber 154.

For the purpose of actuating the valve 151, the casing is provided with piston chambers 155 and 156, containing connected pistons 157 and 158 respectively. Projecting rearwardly from the piston 158 and disposed in the chamber 154, is a stem 159, which is provided with a slide valve 160. The stem 159 terminates adjacent to the stem of the valve 151.

Valve chamber 150 is connected to the main reservoir pipe 92 through a pipe 161 and past a check valve 94. The check valve 94 prevents brake cylinder pressure from flowing to atmosphere during an emergency should the emergency pipe 17 be left open to atmosphere long enough to appreciably reduce main reservoir pressure.

The piston chamber 155 is connected to a volume reservoir 95 by a pipe 96, said pipe being also connected to the seats of the main slide valves 30 and 37 of the main brake control valve device 6, by a passage 97.

Piston chamber 156 is connected to the slide valve chamber 154 by a port 166 through piston 158.

The slide valve chamber 154 is connected to the brake cylinder 13 by a pipe 98.

The limiting valve device 18 may comprise a casing provided with a chamber 140 which is connected to the main reservoir pipe 92 on the limiting valve side of the check valve 94. The chamber 140 contains a valve 141 for controlling the supply of fluid under pressure from the main reservoir pipe, through the feed port 142 to the outlet chamber or pipe 143, in which it is desired to maintain the pressure at a predetermined degree, the pipe 143 being connected by a passage 144 to the seat of the main slide valve 37 of the emergency valve mechanism 23.

The valve 141 is operated by a piston 145 subject on one side to the high pressure as admitted to the chamber 140 and on the other side to pressure in chamber 146 and a spring 147 which normally holds the valve 141 in its closed position.

The pressure of fluid in chamber 147 is controlled by means of a small regulating valve 162 operated by a diaphragm 163, which is subject to the pressure of the outlet chamber on one side of through port 142, and in the opposite direction to the force of an adjustable spring 164, which is set to the desired tension or pressure that it is desired to maintain in the pipe 143.

Since only one brake valve handle 88 is provided per car, it is applied to the brake valve at the operative end of the car, after being removed from the brake valve at the other end of the car. Provision is made for the removal of the brake valve handle in a certain handle off or full service position.

In Fig. 1, the equipment as shown is operative at the left end, the brake valve 7 being in release position, while the brake valve 8 at the opposite end is in handle off position.

With the brake valve 8 in handle off position, the rollers 82 are disposed in the upper portions of the cam faces 83 of the cam 84. The pressure of the cap 79 on the spring 59 thus being relieved, piston 58 is maintained in its up position by spring 60, in which position the release valve 68 is unseated and the supply valve 62 is held seated by its spring 63.

On the other hand, with the brake valve 7 in release position, the rollers 82 are disposed on the lower portions of the cam faces 83, in which the cap 79 compresses the spring 59. Since the spring acts on the piston 58, the latter will be in its down position in which the supply valve 62 is unseated and the release valve 68 is seated.

In changing over from the right end to the left end of the car, the angle cock 138 is first closed so as to cut off communication from the brake pipe 16 to the valve chamber 124 of the relay valve device 12.

With the brake valve 8 in handle off position and the release valve 68 unseated, as has been described, piston chamber 57 is vented to the atmosphere, through chamber 70 and pipe 71, and since the piston chamber 125 of the relay valve device 12 is connected to chamber 57 by means of the pipe 132, the piston chamber 125 will also be vented to the atmosphere. With the pressure of fluid in piston chamber 125 thus relieved, pistons 127 and 128 and slide valve 130 will be shifted to the right, in which the slide valve uncovers vent port 131, so that the valve chamber 124 is also vented to the atmosphere.

With the brake valve handle 88 applied to the brake valve 7 and in release position, and with the angle cock 118 opened, the equipment is charged in the manner to be next described.

Fluid under pressure is supplied to the main reservoir 14 in the usual well known manner and flows therefrom through pipe 92 to chamber 120 of the relay valve device 12, chamber 150 of the relay valve device 15, chamber 140 of the limiting valve device 18, and from pipe 92, through pipe 111, to valve chamber 100 of the relay valve device 10. The fluid under pressure also flows past choke 93 to the emergency pipe 17.

Fluid under pressure thus supplied to the emergency pipe 17 flows through pipe and passage 45 to vent valve chamber 43 of the emergency valve mechanism 23. With the emergency valve mechanism in release position, the fluid flows from the vent valve chamber 43 through passage 44 to piston chamber 32 and at the same time from passage 44, past ball check valve 47, and through passage 46 and port 99 in the main slide valve 37, to valve chamber 34.

From the valve chamber 34, fluid flows through passage 36 to quick action chamber 35 and also through a port 167 in the main slide valve 37 and passage 50, to quick acting closing chamber 49, thereby charging said chambers.

At the same time that fluid under pressure is supplied from the emergency pipe 17 to the emergency valve device 23, fluid is also supplied to valve chamber 61 of the brake valve device 8 at the non-operative end of the car, through pipe 56, feed valve device 11 and pipe 55, and also to the emergency valve chamber 52, but since the valves 51 and 62 are seated, the fluid will be bottled up in said valve chambers.

From the emergency pipe 17, the fluid flows to the piston chamber 57 of the brake valve device 7 at the operative end of the car, through pipe 67, feed valve device 9, pipe 66, valve chamber 61, and past unseated valve 62, the feed valve 9 reducing the pressure of the fluid thus supplied to piston chamber 57 to the amount for which the feed valve is adjusted. Emergency valve chamber 52 of the brake valve 7 is also charged with fluid from the emergency pipe 17, through pipes 67 and 53, but as the valve 51 is seated, the fluid is bottled up in said emergency valve chamber.

From piston chamber 57, fluid at the pressure supplied by feed valve 9, flows through pipe 112 to piston chamber 105 of the relay valve device 10 and shifts the piston 107 to the right so as to unseat valve 101. With valve 101 unseated, fluid at main reservoir pressure is permitted to flow from chamber 100 to valve chamber 104 and from thence, through pipe 117 and angle cock 118, to the brake pipe 16.

When the brake pipe pressure, which is effective in valve chamber 104 and in chamber 106 as supplied through port 116 and acts on the right hand side of piston 107, becomes substantially equal to the opposing pressure in chamber 105, the spring 119 moves the valve 101 to its seat, thereby cutting off the further supply of fluid from the main reservoir to the brake pipe. As the valve 101 seats, it moves the piston 107 and slide valve 110 to the lap position, as shown in Fig. 1.

From the brake pipe 16, fluid flows through pipe and passage 25 to piston chamber 24 of the service valve mechanism 22. With piston 26 in the release position, as shown, the fluid flows from the chamber 24, through the feed groove 168 to valve chamber 27 and at the same time through passage and pipe 28 to the auxiliary reservoir 29, charging said chambers.

With the slide valve 30 in release position, cavity 169 in said slide valve connects passage 97 with atmospheric passage 170, so that the volume reservoir 95 and piston chamber 155 of the relay valve device 15 are vented to the atmosphere.

Since the piston chamber 155 is thus vented to the atmosphere, piston 157 will be disposed at the right end of said chamber, in which position slide valve 160 uncovers atmospheric vent port 165. The brake cylinder 13 is thus vented to the atmosphere, through pipe 98, valve chamber 154 and vent port 165.

When it is desired to effect a service application of the brakes, the brake valve handle 88 is operated to rotate the cam 84, and due to the inclination of the cam faces 83, the cap 79 is permitted to move upwardly and relieve the pressure on the spring 59. This reduction in spring pressure on piston 58 permits the higher fluid pressure in chamber 57 to move the piston upwardly.

In the upward movement of the piston 58, the abutment 65 first moves away from the stem of the supply valve 62, thereby permitting the valve to be seated by spring 63 and cut off the further supply of fluid to the chamber 57, and the release valve 68 is then lifted from its seat thereby venting fluid from chamber 57 to the atmosphere.

Since the piston chamber 105 of the relay valve device 10 is connected to the brake valve piston chamber 57 by pipe 112, the pressure of the fluid in chamber 105 will also be reduced when fluid under pressure in piston chamber 57 is vented to the atmosphere.

As the pressure is reduced in piston chamber 105, the brake pipe pressure acting on the opposite side of the piston 107 shifts the piston toward the left. This action moves the slide valve 110 to service position in which port 171 is uncovered, and permits fluid under pressure to flow from valve chamber 104 to the atmosphere.

In as much as piston chamber 24 of the service valve mechanism 22 is connected to valve chamber 104, through passage and pipe 25, brake pipe 16, and pipe 117, fluid under pressure in piston chamber 24 will be vented to the atmosphere through vent port 171 when the relay valve device 10 is operated in the manner above described.

As the pressure of fluid in piston chamber 24 is thus reduced, fluid at auxiliary reservoir pressure in valve chamber 27, shifts piston 26 upwardly to service position in which communication from piston chamber 24 to the valve chamber 27 through the feed groove 168 will be cut off.

The upward movement of the piston 26 causes a corresponding upward movement of the auxiliary slide valve 31, while the main slide valve 30 remains stationary until the piston 26 has been moved upwardly a predetermined amount and a shoulder 172 on the piston stem engages the main slide valve 30 and the latter will then be moved to service position.

The initial movement of the piston 26 causes the auxiliary slide valve 31 to uncover port 173 in the main slide valve 30. When the shoulder 172 engages the main slide valve 30, and the latter is moved upwardly by the piston 26 to service position, port 173 will register with passage 97, and passage 170 will be lapped.

With the service valve mechanism in service position, valve chamber 27 will be connected to piston chamber 155 of the relay valve device 15, through passage 97 and pipe 96, which permits fluid under pressure to flow from the auxiliary reservoir 29 to the piston chamber 155. The pressure of fluid in piston chamber 155 shifts the piston 157 toward the left, thereby causing the slide valve 160 to lap port 165 and cut off the atmospheric vent of the brake cylinder 13.

When the piston 157 has been moved toward the left a predetermined amount, the stem 159 engages the stem of the valve 151 and the latter will then be unseated from the seat rib 152. Fluid under pressure then flows from the main reservoir 14 to the brake cylinder 13, through pipe 92, past check valve 94, and through pipe 161, to valve chamber 150, and from thence through opening 153, valve chamber 154, and pipe 98, thereby effecting a service application of the brakes in the usual manner.

When a full service application of the brakes is desired, a brake valve handle 88 is moved through the service zone, as shown in Fig. 2, to the position in which the highest portions of the cam faces 83 engage the rollers 82. In this position, the pressure of the spring 59 acting on the piston 58 is reduced to its minimum amount as required in effecting a full service application of the brakes. This permits the pressure of fluid in piston chamber 57 to reduce in the manner hereinbefore described.

When the pressure in piston chamber 57, acting on the piston 58 is thus reduced to a degree slightly less than the opposing pressure of the spring 59, the piston 58 will be moved downwardly by the higher spring pressure, so as to permit the release valve 68 to be seated by spring 75 and thus cut off the further venting of fluid to the atmosphere. Since the downward movement of the piston 58 will be slight, the supply valve 62 will remain seated. It will now be seen that both the supply valve 62 and the release valve 68 are closed or lapped, and the parts will remain in this position, as long as the pressure in the piston chamber 57 corresponds with the pressure to which the spring 59 is set.

Since the piston chamber 105 of the relay valve device 10 is connected to the brake valve piston chamber 57, through pipe 112, the reduction in pressure in the piston chamber 105 is also limited to the same amount as in piston chamber 57, and when the brake pipe pressure in valve chamber 104 is reduced to an amount slightly less than the reduced pressure in the piston chamber 105, then the piston 107 moves the slide valve 110 to the position in which the vent port 171 is lapped. This limits the reduction in brake pipe pressure and in piston chamber 24 of the service valve mechanism.

The auxiliary reservoir 29 is connected to piston chamber 155 of the relay valve device 15 in the manner heretofore described, and an equalization of the pressure in said auxiliary reservoir is permitted to occur in the piston chamber 155, this equalizaton, however, occurring at substantially the same pressure as that to which the brake pipe pressure is reduced. It will be noted, however, that if the reduction in pressure in the piston chamber 24 is slightly less than required to permit such equalization, when the auxiliary reservoir pressure in the valve chamber 27 is reduced to slightly less than the pressure in piston chamber 24, the piston 26 will be moved to lap position in which the supply of fluid from the auxiliary reservoir 29 to the piston chamber 155 is cut off.

With the pressure of fluid thus limited in the relay valve piston chamber 155, the brake cylinder pressure in the valve chamber 154 will build up to a degree substantially equal to that in piston chamber 155, at which time valve 151 will be seated by spring 174, thereby cutting off the further flow of fluid under pressure to the brake cylinder.

While the operation of the equipment in effecting a full service application of the brakes has been described, it will be understood that the amount the brake valve handle 88 is moved from release toward full service position governs the amount of brake pipe reduction and that the degree of brake cylinder pressure obtained is dependent upon the brake pipe reduction. Consequently, the brake valve handle may be operated in steps, so that the brake pipe pressure will be reduced in steps and the brake cylinder pressure will build up in proportional steps, thereby effecting a gradual application of the brakes.

When it is desired to release the brakes, the brake valve handle 88 is moved toward release position, thereby increasing the compression of spring 59. When the pressure of spring 59 is increased to a degree slightly exceeding the pressure of fluid in chamber 57 acting on the opposite side of piston 58, said piston will be moved downwardly by the higher spring pressure, and this action unseats the supply valve 62 and permits the release valve 68 to be seated by its spring 75. With the supply valve 62 unseated, the pressure of fluid in piston chamber 57 is built up from the supply, as supplied from the emergency pipe 17, through pipe 67, feed valve device 9, pipe 66, valve chamber 61, and past unseated valve 62.

From piston chamber 57, fluid at the pressure supplied by feed valve 9, flows through pipe 112 to piston chamber 105 of the relay valve device 10 and shifts the piston 107 to the right. In the movement of the piston 107 to the right, slide valve 110 laps the vent port 171 and the piston stem 109 engages the stem of valve 101 and the valve 101 is moved toward the right away from the seat rib 102. With valve 101 thus unseated, fluid at main reservoir pressure is permitted to flow from chamber 100 to valve chamber 104 and from thence through pipe 117 and angle cock 118, to the brake pipe 16.

When the brake pipe pressure, which is effective in valve chamber 104 and in chamber 106 as supplied through port 116 and acts on the right hand side of piston 107, becomes substantially equal to the opposing pressure in chamber 105, the spring 119 moves the valve 101 to its seat, thereby cutting off the further supply of fluid from the main reservoir to the brake pipe. As the valve 101 seats, it moves the piston 107 and slide valve 110 to the lap position, as shown in Fig. 1.

From the brake pipe 16, fluid flows through pipe and passage 25 to piston chamber 24 of the service valve mechanism 22. When the pressure of fluid in piston chamber 24 has been increased a predetermined amount, sufficient force is exerted upon piston 26 to move said piston and the main slide valve 30 and auxiliary slide valve 31 downward toward release position. Further movement in this direction by the piston 26 will be prevented when the piston head engages a stop 175. The main slide valve 30 and the auxiliary slide valve 31 will now be positioned as shown in Fig. 1, whereupon fluid in piston chamber 155 of the relay valve device 15 will exhaust to the atmosphere by way of pipe 96, passage 97, cavity 169 in the main slide valve 30, and passage 170.

When the piston chamber 155 is thus vented to the atmosphere, piston 157 is shifted toward the right by the fluid under pressure in chamber 156 at the opposite side of said piston. In the movement of the piston 157 to the right slide valve 160 uncovers the vent port 165 The brake cylinder 13 is thus vented to the atmosphere, through pipe 98, valve chamber 154 and vent port 165.

When it is desired to effect an emergency application of the brakes, the brake valve handle 88 is moved to emergency position (see Fig. 2). The brake valve device 7, relay valve device 10, service valve mechanism 22, and relay valve device 15 will then be successively operated in the manner heretofore described in connection with a service application of the brakes, and in addition, the emergency valve mechanism will also be operated.

In the movement of the brake valve handle to emergency position, the arm 90 is engaged by the cam 87 and moved toward the right, thereby unseating the emergency valve 51. Fluid under pressure is thus permitted to vent to the atmosphere from the emergency pipe 17, by way of pipes 67 and 53, valve chamber 52, past unseated valve 51, and through opening 86, at a rate much faster than can be maintained by the choke 93 between the main reservoir pipe 92 and the emergency pipe 17.

Since the emergency piston chamber 32 is connected to the emergency pipe 17 through passage 44, vent valve chamber 43, and passage and pipe 45, fluid under pressure in piston chamber 32 will be vented to the atmosphere. When the pressure is thus reduced in the emergency piston chamber 32, this permits the pressure in valve chamber 34 to shift the emergency piston 33 and slide valves 37 and 38 toward the right, and the piston 33 compresses the spring stop 176 and seals against the gasket 177.

With the piston 33 in emergency position, cavity 178 in the main slide valve 37 connects passages 40 and 50, thereby permitting fluid under pressure from quick action closing chamber 49 to flow to vent valve piston chamber 39 and force the vent valve piston 41 upwardly. The upward movement of piston 41 will unseat the vent valve 42, so as to suddenly vent fluid under pressure from the emergency pipe 17 and thus cause a quick serial venting of the emergency pipe in the usual manner. Fluid under pressure supplied from the quick acting closing chamber 49 to operate piston 41 will gradually exhaust to the atmosphere, through port 179 in the piston chamber 180, port 181, and vent port 48, and when reduced to a predetermined degree, the spring acting on the vent valve 42 will seat said vent valve and return the piston 41 to the normal position as shown.

In emergency position, cavity 182 in the main slide valve 37 connects passages 97 and 144. Fluid at a pressure greater than obtained in a full service application of the brakes is then supplied to the piston chamber 155 of the relay valve device 15 from the limiting valve device 18, the operation of which will be hereinafter described, through feed port 142, pipe 143, passage 144, valve cavity 182, passage 97, and pipe 96.

Since piston chamber 155 of the relay valve device 15 is supplied with fluid under pressure by the hereinbefore described operation of the brake valve device 7, relay valve device 10, and service valve mechanism 22, the fluid under pressure supplied from the limiting valve device 18, as controlled in an emergency application of the brakes by the operation of the emergency valve mechanism 23, will augment the pressure of fluid supplied to the piston chamber 155 by the service valve mechanisms, and the piston 157 will be quickly shifted toward the left. The slide valve 160 then laps port 165, so as to cut off the atmospheric vent of the brake cylinder 13, and when the piston 157 has been moved toward the left a predetermined amount the stem 159 engages the stem of the valve 151 and the latter will then be unseated from the seat rib 152. Fluid under pressure then flows from the main reservoir to the brake cylinder in the manner heretofore described to effect in emergency application of the brakes.

Normally pipe 143 from the limiting valve device 18 is lapped by the emergency slide valve 37. Fluid at main reservoir pressure flows through pipe 92 to chamber 140 and equalizes through port 148 in the valve piston 145 into chamber 146, which permits said valve piston to be seated by spring 147. Fluid also flows past valve 162 to chamber 183 and acts on diaphragm 163. When the pressure on the diaphragm is thus built up sufficiently to overcome the adjusted pressure of spring 164, the diaphragm is deflected to the right, permitting the valve 162 to seat.

With the limiting valve device 18 in this condition, when the emergency valve mechanism operates to vent fluid under pressure from pipe 143 to the relay valve piston chamber 155, the pressure is reduced in diaphragm chamber 183. This permits spring 164 to deflect the diaphragm 163 and unseat the valve 162. With the valve 162 unseated, fluid under pressure flows from chamber 146 at a rate exceeding the supply capacity of port 148. This reduces the pressure in chamber 146 and permits fluid at main reservoir pressure in chamber 140 to shift the valve piston 145 to the left so that the valve 141 is unseated from its seat rib and spring 147 is compressed.

With the valve 141 thus unseated, fluid under pressure flows from the main reservoir pipe 92 to pipe 143 and also to diaphragm chamber 183. When the pressure of fluid thus supplied to pipe 143 and chamber 183 and acting on the diaphragm 163, builds up to a degree slightly exceeding the adjusted pressure of spring 164, the diaphragm is deflected to the right against the pressure of the spring 164 and permits spring 186 to seat valve 162. Fluid continues to flow through port 148 in valve piston 145 and when substantially equalized on opposite sides of said valve piston, spring 147 moves the valve piston to the right, seating the valve 141 and cutting off the supply to pipe 143, thereby limiting the pressure supplied to pipe 143 to the adjusted valve of spring 164. However, it will be noted that this pressure is greater than obtained in a full service application of the brakes in order to effect an emergency application with a high brake cylinder pressure.

With the piston 33 in emergency position, the tail of the main slide valve 37 uncovers a passage 184, thereby permitting fluid under pressure to flow to passage 97, leading to the piston chamber 155 of the relay valve device 15, from the quick action chamber 35, by way of passage 36 and valve chamber 34. The reduction in pressure thus caused in the valve chamber 34 will permit the emergency piston 33 to return to release position, upon releasing the brakes by a less increase in emergency pipe pressure than if the pressure in the valve chamber were not reduced, thereby insuring a return of the emergency valve mechanism to the release position.

The volume reservoir 95 is connected to piston chamber 155 for the purpose of increasing the volume of said chamber. In this way pressure variations acting on piston 157 can be more accurately controlled.

It will be evident from the above description of the operation of the device to effect an emergency application of the brakes that the limiting valve device 18 will insure against such a high brake cylinder pressure as to make a release of the brakes very slow or even impossible.

When it is desired to release the brakes after an emergency, the brake valve handle 88 is operated toward release position. The cam surface 87 is thus moved away from the end of the arm 90, thereby permitting spring 91 to seat the emergency valve 51. At the same time, the service application control parts of the brake valve device 7 will operate so that the relay valve device 10 and service valve mechanism 22 will be returned to release position in the manner heretofore described.

When the emergency valve 51 is thus seated the venting of fluid from the emergency pipe 17 to the atmosphere is cut off. The pressure of fluid in the emergency pipe will then be built up from the main reservoir supply, as supplied through choke 93.

Fluid under pressure thus supplied to the emergency pipe 17 flows through pipe and passage 45 to vent valve chamber 43, and from thence through passage 44 to piston chamber 32. When the pressure in chamber 32 has been increased a predetermined amount, sufficient force is exerted on the piston 33 to move said piston and the slide valves 37 and 38 to the left toward release position. Further movement in this direction by the piston 33 will be prevented when the piston head engages a stop 187. The main slide valve 37 and the auxiliary slide valve 38 will now be positioned as shown in Fig. 1, whereupon fluid will be supplied to valve chamber 34 from passage 44, through passage 46, past ball check valve 47 and port 99 in the main slide valve 37. From valve chamber 34, fluid flows through passage 36 to quick action chamber 35 and also through port 167 in the main slide valve 37 and passage 50, to quick action closing chamber 49, thereby recharging said chambers.

When the service valve mechanism 22 returns to release position, as has been previously described, the slide valves 30 and 31 will be so positioned that fluid in piston chamber 155 of the relay valve device 15 will exhaust to the atmosphere by way of pipe 96, passage 97, cavity 169 in the main slide valve 30 and passage 170. With the reduction in pressure in piston chamber 155, the higher pressure in chamber 156, acting on the opposite side of the piston 157, shifts said piston toward the right, so that the slide valve 160 uncovers the vent port 165. The brake cylinder 13 is then vented to the atmosphere, through pipe 98, valve chamber 154 and vent port 165.

In prior devices of this nature the service valve mechanism and the emergency valve mechanism were operated by variations in brake pipe pressure, and if the service rate of reduction in brake pipe pressure exceeded a predetermined limit an undesired emergency application of the brakes was obtained. According to the present invention, this undesirable feature is overcome by providing an independent control of the emergency valve mechanism, so that the emergency valve mechanism is at no time subject to the pressure of the brake pipe through which the service valve mechanism is controlled. Therefore, the emergency valve mechanism will not operate except upon a reduction in emergency pipe pressure as effected only by the brake valve device in emergency position.

From the foregoing it will be evident that I have produced a fluid pressure brake equipment by means of which a service application and release of the brakes can be more quickly effected. This is due to the fact that feed valves are provided for controlling the small volumes of pressure in the piston chambers 105 and 125 of the relay valve devices 10 and 12 respectively and the pipes leading from said feed valves to said piston chambers. The relay valves 10 and 12 therefore respond promptly to increases or decreases of this pressure and this results in a quick charging or reduction in brake pipe pressure. Furthermore, when a service application of the brakes is initiated, the auxiliary reservoir 29 is connected only to the small volume of the piston chamber 155 of the relay valve device 15 and volume reservoir 95, with the result the relay valve device 15 is promptly operated so that fluid under pressure is quickly supplied to the brake cylinder.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with an emergency pipe and means operated upon a reduction in emergency pipe pressure for effecting an emergency application of the brakes, of a brake pipe, means operated upon a reduction in brake pipe pressure for effecting a service application of the brakes, and a single means for controlling said emergency pipe and said brake pipe pressure.

2. The combination with an emergency pipe and means operated only upon a reduction in emergency pipe pressure for effecting an emergency application of the brakes, of a brake pipe, means operated upon a reduction in brake pipe pressure for effecting a service application of the brakes, and a single valve device for controlling said emergency pipe and said brake pipe pressure.

3. The combination with an emergency pipe and an emergency valve device operated upon a reduction in emergency pipe pressure, of a brake pipe, means operated upon a reduction in brake pipe pressure for effecting a service application of the brakes, and a single valve device for controlling the pressures in both of said pipes.

4. The combination with an emergency pipe and an emergency valve device operated upon a reduction in emergency pipe pressure, of a brake pipe, service application valve mechanism operated upon a reduction in brake pipe pressure, and a single means for venting fluid from both of said pipes.

5. The combination with an emergency pipe and an emergency valve device operated upon a reduction in emergency pipe pressure, of a brake pipe, service application valve mechanism operated only upon a reduction in brake pipe pressure, and a single manually operated valve device for venting fluid from said brake pipe and from said emergency pipe.

6. The combination with an emergency pipe and an emergency valve device operated upon a reduction in emergency pipe pressure, of a brake pipe, valve mechanism operated only upon a reduction in brake pipe pressure for effecting a service application of the brakes, valve means connected to both of said pipes, and a single handle for operating said valve means.

7. The combination with an emergency pipe and an emergency valve device operated upon a reduction in emergency pipe pressure, of a brake pipe, valve mechanism operated only upon a reduction in brake pipe pressure for effecting a service application of the brakes, valve means for venting fluid from each of said pipes, and a single handle for operating said valve means.

8. In a fluid pressure brake, the combination with a brake cylinder, of a valve device operated upon an increase in fluid under pressure for supplying fluid under pressure to the brake cylinder, a brake valve device for controlling the operation of said valve device, and a plurality of valve devices, each operated upon a decrease in fluid pressure, for transmitting the operation of the brake valve device to the first mentioned valve device.

9. In a fluid pressure brake, the combination with a brake cylinder, of a valve device operated upon an increase in fluid under pressure for supplying fluid under pressure to the brake cylinder, a brake valve device for controlling the operation of said valve device, and a series of valve devices interposed between the first mentioned valve device and the brake valve device and each operated upon a reduction in fluid pressure for transmitting the operation of the brake valve device to the first mentioned valve device.

10. In a fluid pressure brake, the combination with a main reservoir and a brake cylinder, of a valve device for controlling the supply of fluid under pressure from the main reservoir to the brake cylinder, a brake valve device for controlling the operation of said valve device, an emergency pipe connected to said brake valve device, an emergency valve device operable only upon a reduction in emergency pipe pressure for transmitting the operation of the brake valve device to the first mentioned valve device, and means controlled by the operation of said emergency valve device for limiting the pressure of fluid supplied from the main reservoir to the brake cylinder.

11. In a fluid pressure brake, the combination with a main reservoir and a brake cylinder, of a valve device operable upon an increase in fluid pressure for supplying fluid under pressure from the main reservoir to the brake cylinder, a brake valve device for controlling the operation of said valve device, an emergency pipe connected to said brake valve device, an emergency valve device opreable only upon a reduction in emergency pipe pressure for transmitting the operation of said first mentioned valve device, and means controlled by the operation of said emergency valve device for limiting the pressure of fluid supplied from the main reservoir to the brake cylinder.

12. In a fluid pressure brake, the combination with a main reservoir and a brake cylinder, of a valve device operable upon an increase in fluid pressure for supplying fluid under pressure from the reservoir to the brake cylinder, a brake valve device, a brake pipe charged with fluid under pressure, a valve device operable upon a reduction in brake pipe pressure for supplying fluid under pressure from the reservoir to the brake cylinder, and means controlled by the last mentioned valve device for limiting the pressure of fluid supplied to the brake cylinder.

13. In a fluid pressure brake, the combination with a main reservoir and a brake cylinder, of means operable upon an increase in fluid pressure for supplying fluid under pressure from the reservoir to the brake cylinder, a valve device operable upon a reduction in fluid pressure for controlling the supply of fluid under pressure to said means, a second valve device operable upon a reduction in fluid under pressure for reducing the fluid pressure acting on the first valve device, and a brake valve device for venting fluid under pressure acting on said second valve device in accordance with the pressure desired in the brake cylinder.

14. In a fluid pressure brake, the combination with a main reservoir and a brake cylinder, of means associated with the brake cylinder for controlling fluid under pressure supplied from the main reservoir to the brake cylinder, a brake valve device for controlling the operation of said means, an emergency pipe connected to said brake valve device, an emergency valve device operable only upon a reduction in emergency pipe pressure for transmitting the operation of the brake valve device to said brake cylinder control means, and means controlled by the operation of said emergency valve device for limiting the pressure of fluid supplied from the main reservoir to the brake cylinder.

15. In a fluid pressure brake, the combination with a main reservoir and a brake cylinder, of control means operable upon an increase in fluid pressure for supplying fluid under pressure from the reservoir to the brake cylinder, fluid pressure operated means for controlling the supply of fluid under pressure to said control means, a second fluid pressure operated means for controlling the operation of said first mentioned fluid pressure operated means, and manually operated means for controlling the supply of fluid pressure controlling said second fluid pressure operated means.

16. In a fluid pressure brake, the combination with a main reservoir and a brake cylinder, of a valve device for supplying fluid under pressure from the reservoir to the brake cylinder, a brake valve device, a service application valve device for controlling said valve device, means interposed between the brake valve device and the service application valve device for controlling the operation of said service application valve device, an emergency pipe connected to said brake valve device, an emergency valve device operable only upon a reduction in emergency pipe pressure for transmitting the operation of the brake valve device to said first mentioned valve device, and means controlled only by the operation of said emergency valve device for limiting the pressure of fluid supplied from the main reservoir to the brake cylinder.

17. In a fluid pressure brake, the combination with a main reservoir and a brake cylinder, of a valve device operable upon an increase in fluid pressure for supplying fluid under pressure from the reservoir to the brake cylinder, a brake valve device, a service application valve device operable upon a reduction in fluid pressure for controlling said valve device, means interposed between the brake valve device and the service application valve device and operable upon a reduction in fluid pressure for reducing the fluid pressure in said service application valve device in accordance with the pressure desired in the brake cylinder, an emergency pipe connected to said brake valve device and independent of said means, an emergency valve device operable only upon a reduction in emergency pipe pressure for controlling the operation of said first mentioned valve device, and means controlled only by the operation of said emergency valve device for limiting the pressure of fluid supplied from the main reservoir to the brake cylinder.

In testimony whereof I have hereunto set my hand, this 19th day of November, 1930.

JOSEPH C. McCUNE.